(12) United States Patent
Venkataraman

(10) Patent No.: US 10,700,972 B2
(45) Date of Patent: Jun. 30, 2020

(54) COMPUTER IMPLEMENTED SYSTEM AND METHOD FOR PRESERVING MAPPING INFORMATION IN IP-OPTIONS

(71) Applicant: COLORTOKENS, INC., Santa Clara, CA (US)

(72) Inventor: Natarajan Venkataraman, Bangalore (IN)

(73) Assignee: COLORTOKENS, INC. CA (US)

( * ) Notice: Subject to any disclaimer, the term of this patent is extended or adjusted under 35 U.S.C. 154(b) by 0 days.

(21) Appl. No.: 16/115,589

(22) Filed: Aug. 29, 2018

(65) Prior Publication Data
US 2020/0076733 A1   Mar. 5, 2020

(51) Int. Cl.
*H04L 12/28* (2006.01)
*H04L 12/749* (2013.01)
*H04L 29/12* (2006.01)
*H04L 29/06* (2006.01)

(52) U.S. Cl.
CPC ........ *H04L 45/741* (2013.01); *H04L 61/2517* (2013.01); *H04L 61/2575* (2013.01); *H04L 69/22* (2013.01); *H04L 69/16* (2013.01)

(58) Field of Classification Search
CPC .............................. H04L 45/741; H04L 69/22
See application file for complete search history.

(56) References Cited

U.S. PATENT DOCUMENTS

| 2004/0052259 A1* | 3/2004 | Garcia | H04L 43/00 370/392 |
| 2006/0067342 A1* | 3/2006 | Dispensa | H04L 29/12254 370/401 |
| 2008/0072279 A1* | 3/2008 | Miao | H04W 80/04 726/1 |

* cited by examiner

*Primary Examiner* — Bo Hui A Zhu
(74) *Attorney, Agent, or Firm* — Barry Choobin; Patent 360 LLC

(57) ABSTRACT

The present disclosure envisages a computer implemented method, a corresponding computer implemented system and a computer program product that envisage inserting the mapping information—including source IP address and source port number—that maps the IP datagram back to its origin endpoint (i.e. the source computing node at which the IP datagram was originally created), into an IP-options field of the corresponding IP datagram. Additionally, the present disclosure envisages anticipating the default behaviour of the Network Address Translation (NAT) device (for instance, a gateway) characterized by replacement of the source IP address and the source port number (mapping information) stored in the IP header of the IP datagram with a translated IP address and translated port number, and facilitating trustful and non-repudiable verification of the source computing node as the creator of the IP datagram, on the destination computer network.

12 Claims, 5 Drawing Sheets

COMPUTER IMPLEMENTED SYSTEM AND METHOD FOR PRESERVING MAPPING INFORMATION IN IP-OPTIONS

DEFINITION OF TERMS USED IN THE PRESENT DISCLOSURE

The term 'mapping information' typically denotes the combination of 'source IP address-source port number pair' and the corresponding 'translated IP address-translated port number' pair. In accordance with the present disclosure, the term 'mapping information' is used to represent the former part of the combination, i.e. the source IP address and source port number, which when analysed maps a corresponding IP datagram back to its origin endpoint.

BACKGROUND

Technical Field

The present disclosure relates to internetworking and data communication. Particularly, the present disclosure relates to gateways used for Network Address Translation (NAT). More particularly, the present disclosure relates to methods and systems used for retaining within a network packet the information representative of the corresponding source IP address and source port number.

Description of Related Art

To address the ever-increasing need to seamlessly connect geographically displaced end-user terminals, the Transport Control Protocol/Internet Protocol (TCP/IP) suites were introduced. Widespread use of computer and the recent advancements in the field of computer networks and network communication have enhanced the use of TCP/IP protocol suite in many of today's internetworks. The TCP/IP protocol suite enables geographically dispersed computer devices to connect and communicate with one another by the way of exchanging IP datagrams. Typically, internet layer devices such as routers and gateways facilitate routing of IP datagrams between the nodes or hosts, by establishing a data path therebetween.

Typically, gateways are used to enable computer users to access remotely located target computer systems (for example, a mail server located on a computer network). A gateway typically provides connectivity between various computer systems irrespective of whether they are proximate to one another or located remotely and distantly from one another. Typically, a gateway receives a (network) packet on one port from a source computing node and forwards the received packet on another port to a destination computing node. Before forwarding the received packet to the destination computing node, the gateway simultaneously performs a 'look-up' operation to determine a specific port to be used for forwarding the received packet. Typically, the phenomenon of forwarding a received packet involves routing the packet through a plurality of gateways before eventually reaching the destination computing node.

Further, preferably, a gateway is also configured to perform the task of Network Address Translation (NAT) which involves, as the name suggests, a substitution of the local address or original address (referred to as 'source IP address' hereafter) assigned to the network packet at the time of creation and embedded in the received network packet, with a new IP address (referred to as 'translated IP address' or 'NAT'ed IP address' hereafter) unique to the destination computer network. Preferably, the port number (referred to as 'source port number' hereafter) embedded in the packet received by the gateway (received packet) is also replaced by a new port number (referred to as 'translated port number' or 'NAT'ed port number' hereafter). Preferably, the translated IP address and translated port number are an external IP address and external port number (respectively) which are bound (mapped) by the gateway, at least in a semi-permanent manner, to respective source IP address and source port number assigned to the network packet at the time of creation. A gateway, given its ability to perform NAT, is also referred to as a NAT device, and throughout the present disclosure the term 'NAT device' refers to a gateway unless specified otherwise.

Taking into consideration an exemplary packet based communication scenario involving at least two participants, i.e. the source computing node and the destination computing node, it is pertinent to note that the local address or original address (for instance, 'address-S') assigned to the source computing node is translated into a (new) external address (for instance 'address-E') which is unique to the destination computing node. Preferably, a gateway configured to facilitate communication between the source computing node and destination computing node by the way of exchange of network packets (referred to as IP datagrams hereafter) therebetween, maintains Mapping information indicating that the source IP address 'address-S' is to be translated (NAT'ed) into external IP address 'address-E' in the upstream direction, i.e., when IP datagrams are transmitted from the source computing node to the destination computing node. Similarly, the gateway would also translate the external IP address 'address-E' into source IP address 'address-S' when the flow of IP datagrams is in a downstream direction. i.e., from the destination computing node to the source computing node. Additionally, the gateway also determines the specific port on which the IP datagrams are to be transmitted. Preferably, in the upstream direction the port to be used for transmission depends on the IP address of the destination computing node, while in the downstream direction, the transmission port is determined preferably based on the local IP address (source IP address; 'address-S') or the external IP address ('address-E') assigned to the source computing node.

It is evident from the foregoing that the gateway, while transmitting an IP datagram from the source computing node to the destination computing node, translates the source IP address 'address-S' into external IP address 'address-E', and further translates the port number depending upon the direction of transmission and depending upon the IP address assigned to the destination, as discussed above. Typically, the translated IP address and the translated port number replace the (original) source IP address and the source port number stored within the IP datagram (the translated IP address and translated port number being unique to the destination computing node), and the IP datagram incorporating the translated IP address and the translated port number is transmitted by the gateway through to the destination computing node.

Further, in a case where IP datagrams are transmitted from the source computing node to the destination computing node, the fact that the source IP address and the source port number assigned to the IP datagram are replaced in transit with the translated IP address and the translated port number by the gateway, imposes further restrictions as far as the implementation of micro-segmentation on a computer network (incorporating the source computing node and the destination computer node inter-alia) is concerned.

Micro-segmentation is a phenomenon that aims to provide micro-level protection for network components and resources by monitoring and controlling the communications between at least two devices (i.e., the source computing device and the destination computing device in this case) by creating a micro-segment within the computer network, and by categorizing the said two devices as a part of the said micro-segment and bound be fine-grained network security policies assigned to the (particular) micro-segment. Further, the phenomenon of micro-segmentation also aims to regulate the network traffic between the devices forming the micro-segment, based on certain rules preferably pre-established by a network administrator, and to also entrust the network administrator with a level of control and visibility over the communication exchanged between the said two devices forming the micro-segment.

Some of the prerequisites for implementation of micro-segmentation across a computer network include creation of micro-segments across the computer network, and installation of a predetermined network security software at each of the end-point computer devices constituting a micro-segment; the network security software having been pre-programmed to inspect the IP datagrams received by and emanating from the respective end-points, and to determine whether the said IP datagrams are generated from and directed to trustful endpoints. The phenomenon of micro-segmentation typically aims to implement a zero-trust security policy across the entire computer network wherein every IP datagram directed to/emanating from an endpoint is deemed at least provisionally suspicious, until the parameters corresponding to the IP datagram including (but not restricted to) source IP address and source port number are inspected by the network security software, and the corresponding IP datagram is categorically identified as not being related to a malicious activity that would in turn compromise the security of the computer network. Typically, any IP datagram whose source IP address and source port number are inspected and categorized as being untrustful, is immediately labelled as a security threat and any further transmission of such an IP datagram is blocked, and consequentially the IP datagram is dropped.

As discussed above, the gateway, during the transmission of the IP datagram therethrough, replaces the source IP address and the source port number corresponding to (incorporated within) the IP datagram with the translated IP address and translated port number, thereby masking the original source IP address and the source port number and rendering only the translated IP address and translated port number visible and consequentially available for inspection at the destination computing node. Therefore, the network security software which analyses the IP datagram to determine whether the said IP datagram originated from a trustful source, would be presented with the translated IP address and translated port number instead of the (original) source IP address and source port number which ideally would have acted as a benchmark for establishing the genuineness of the IP datagram. The presence of the translated IP address and translated port number instead of the (original) source IP address and source port number renders the network security software unable to trace the original source IP address and the source port number as well as the path of the IP datagram beyond the (intermediary) gateway.

Further, the fact that more than one gateway could manipulate the IP datagram and translate the source IP address and the source port information incorporated therein into respective translated IP address and translated port number further complicates the task of the network security software in terms of identifying the original source IP address and source port number assigned to the IP datagram. Any inadequacy on the part of the network security software to trustfully trace the origin endpoint of an IP datagram would cause the IP datagram to be labelled as suspicious and as related to a malicious activity, with any further transmission of the IP datagram being immediately blocked and the IP datagram eventually being discarded. Given the fact that the implementation of micro-segmentation entails execution of a zero-trust policy across the computer network, any IP datagram whose source (i.e., source IP address and source port number) cannot be trustfully identified is immediately labelled as malicious activity and discarded, irrespective the fact that the original source IP address and source port number of the IP datagram were replaced at a gateway with a corresponding translated IP address and translated port number.

More often than not, a gateway, which by virtue of its functional configuration replaces the (original) source IP address and source port number assigned to the IP datagram with the translated IP address and translated port number, creates a barrier often unsurmountable for the implementation of micro-segmentation. However, the phenomenon of micro-segmentation, given its software only security approach, inherent ability to support fine-grained data security policies, and to implement a zero-trust security policy, forms a critical irreplaceable part of a network security plan, which cannot be jettisoned if a computer network is to be rendered secured down to the lowest possible level (i.e., typically down to the workload level).

In order to overcome the aforementioned barriers and to implement micro-segmentation in a computer network comprising at least one gateway, the phenomenon of overlay networks was introduced. The use of overlay networks ensured than even though the addresses and port numbers associated with the IP datagrams transmitted on the underlying IP network were translated, the IP datagrams transmitted on the corresponding overlay network were not subject to network address translation (NAT). However, the use of overlay networks to overcome the barriers created by a conventional IP network for the implementation of micro-segmentation are also manifold including the need for a separate IP address management policy, need for additional overlay tunnels to name a few. Another possible alternative to the use of overlay networks is the phenomenon of out-of-band transmission of Mapping information and forwarding information—the NAT information describing the mapping between the source IP address and the external IP address corresponding to an IP datagram, and the forwarding information describing the port interface to be used for transmission of the IP datagram. However, one of the drawbacks associated with the out-of-band transmission methodology is the predominant need for a low-latency communication network which in turn is resource intensive and characterized by comparatively higher packet drop rates.

In view of the drawbacks discussed hitherto, there was felt a need for an effective alternate approach that would not only address the drawbacks associated with overlay networks and out-of-band transmission methods but facilitated simultaneous implementation of micro-segmentation as well as traditional network gateways in a computer network, without compromising on neither the security of the computer network nor the operational efficiency of the computer network owing to the absence of either micro-segmentation or the gateways. There was felt a need for a computer implemented system and method that enables network security software installed at various endpoints of the computer network with unhindered access to the source IP address and source port number of an IP datagram irrespective of the fact that the IP datagram was routed through one or more gateways. Further, there is also felt a need for a computer implemented system and method that renders an IP datagram capable of preserving the information corresponding to the source IP address and source port number, despite having passed through one or more gateways.

Objects

An object of the present disclosure is to envisage a computer implemented system and method that allows for retaining a source IP address and source port number (Network Address Translation Information—Mapping information) in an IP datagram, despite the IP datagram transmitted through one or more NAT devices (gateways).

Yet another object of the present disclosure is to envisage a computer implemented system and method that anticipates the modification of source IP address and source port number in an IP datagram, and provides an alternative for storing the source IP address and source port number in an IP datagram in a non-manipulatable manner.

Still a further object of the present disclosure is to enable a computer device to accurately determine the source IP address and source port number of an in-bound IP datagram, despite the IP datagram having transmitted through at least one NAT device.

One more object of the present disclosure is to envisage a computer-implemented system and method that enables in-band transmission of source IP address and source port number corresponding to an IP datagram, thereby accounting for translation of the source IP address and source port number at an intermediate NAT device.

Another object of the present disclosure is to envisage an in-band transmission mechanism that is executable a computer-based communication network without impairing the functionality of NAT devices pre-installed on the communication network.

Still a further object of the present disclosure is to envisage an in-band transmission mechanism that is not prone to the phenomenon of packet-drop.

Another aspect of the present disclosure is to envisage an in-band transmission mechanism that exhibits a near zero transmission latency, in contrast to conventional out-of-band transmission mechanisms used for transmitting NAT information.

SUMMARY

The present disclosure is summarized taking into consideration a typical IP datagram transmission scenario which in turn involves an IP datagram created at a source computing node being transmitted to a destination computing node via at least one Network Address Translation device (a NAT device such as a gateway). Throughout the present disclosure, the Network Address Translation device is exemplified using a gateway. The term 'NAT device' and 'gateway' are used in an interchangeable manner throughout the present disclosure, and unless otherwise specified, the term 'NAT device' always refers to a gateway—with the external IP address and port number assigned by the gateway (to the IP datagram) being referred to as 'translated IP address' and 'translated port number' respectively, and the IP address assigned to the gateway being referred to as 'NAT device's IP address'.

Typically, the source computing node, which creates the said IP datagram is described as being connected to a source computer network, and the destination computing node is described as being connected to a destination computer network. Preferably, the source computer network is connected to the destination computer network via at least one intermediary outside network with specifically programmed NAT devices (gateway) functioning as interfaces between the source computer network, the destination computer network and intermediary outside computer network.

Further, the IP datagram created at the source computing node is associated with the corresponding 'source IP address' and 'source port number', which in combination is used not only to indicate the status of the source computing node as the creator of the said IP datagram, and also to identify the said IP datagram within the source computer network as originating from and belonging to the source computing node. While the combination of the 'source IP address' and 'source port number' is sufficient to uniquely identify the corresponding source computing node within the source computer network, it is necessary that the 'source IP address' and 'source port number' are translated or mapped to a different external IP address and external port number respectively, so as to facilitate unique identification of the source computing node on one or more outside networks and the destination computer network (given the possibility that the 'source IP address' and 'source port number' assigned to the IP datagram at the time of creation do not uniquely identify the corresponding source computing node on one or more outside networks and the destination network), thereby facilitating appropriate transmission of the IP datagram via at least one outside network, through to the destination computer network.

Since the 'source IP address' and 'source port number' originally assigned to the IP datagram does not uniquely identify the source computing node on one or more outside networks and the destination computer network, an appropriately programmed network address translator (for example, a gateway) translates or maps the 'source IP address' and 'source port number' to a different external IP address and external different port number (referred to as translated IP address and translated port number respectively) so as to facilitate unique identification of the source computing node within the one or more outside networks and the destination computer network, thereby facilitating a seamless transmission of the IP datagram from the source computer network to the destination computer network via one or more outside networks.

The present disclosure teaches a computer implemented method, a corresponding computer implemented system and a computer program product for facilitating insertion of Mapping information—including source IP address and source port number—that maps the IP datagram back to its origin endpoint (i.e. the source computing node at which the IP datagram was originally created), into an IP-options field of the corresponding IP datagram, in addition to the well-known, prior-art phenomenon of inserting the mapping information onto the IP header of the IP datagram. Additionally, the computer implemented method and the corresponding computer implemented system and computer program product envisage anticipating the default behaviour of the Network Address Translation (NAT) device (for instance, a gateway)—which is characterized by replacement of the source IP address and the source port number (mapping information) stored in the IP header of the IP datagram with a translated IP address and translated port number—and facilitating trustful and non-repudiable verification of the source computing node as the creator of the IP datagram, on the destination computer network.

By inserting into the IP-options field, the source IP address and source port number identifying the source computing node as the creator of the IP datagram, the present disclosure anticipates the phenomenon of the source IP address and source port number present in the IP header (of the IP datagram) being replaced by the translated IP address and the translated port number, at an intermediary gateway, and proposes an effective countermeasure to nullify the probable implications of such a replacement, on the implementation of micro-segmentation across the computer network being utilized for transmission of the IP datagram. Further, the computer implemented program and the corresponding system and computer program product disclosed by the present disclosure also prevent any NAT device, for example a gateway (through which the IP datagram is routed to the destination computing node) from manipulating the IP-options field and inserting its own IP address (referred to as NAT device's IP address) thereto as per conventional operational procedure, by configuring the IP-options field to always (across the end-to-end packet transmission path) appear fully populated (FULL).

In accordance with the present disclosure, the possible IP-options utilized for storing the source IP address and the source port number (indicative of the source of the IP datagram) include the IP Record Route option and IP Internet Timestamp option. However, it will be apparent to those skilled in the art that any other IP-options compatible with end-to-end delivery process for IPv4 traffic, and capable of storing at least 'six' bytes of information could be used instead of the IP Record Route option and IP Internet Timestamp option. It is to be noted that throughout the specification, IP Record Route option and IP Internet Timestamp option have been used in an exemplary sense in order to describe the features of the proposed computer implemented method, system and computer program product, and therefore, the explanation pertinent to the use of IP Record Route option and IP Internet Timestamp option should not be construed in a limiting sense. Further, it is also possible that IP-options which are newly envisaged or currently reserved for experimentation are used for storing the source IP address and the source port number indicative of the source of the IP datagram, as long as those IP-options are compatible with end-to-end delivery process for IPv4 traffic. However, for the sake of explanation, the computer-implemented system, method and computer program product envisaged by the present disclosure are explained taking into consideration the use of IP Record Route option (also referred to as 'Record Route option) and IP Internet Timestamp option (also referred to as 'Internet Timestamp option') for storing the source IP address and the source port number indicative of the source of an IP datagram.

The default behaviour of a gateway is to manipulate the IP-options field (i.e. either the Internet Timestamp option field or the Record Route option field, based on the implementation) by inserting its (gateway's) own IP address (referred to as NAT device's IP address) thereto. Conventionally, in case of the Record Route option, the gateway inserts only the IP address, i.e. the IP address assigned to the gateway (NAT device's IP address) while in case of Internet Timestamp option, the gateway inserts the IP address assigned thereto in combination with a timestamp indicative of the time at which the IP datagram was received by the gateway. However, the gateway digresses from its default behaviour and elects to forward transmit the IP datagram without inserting its own IP address (in case of Record Route option), or without inserting its own IP address and the timestamp (in case of Internet Timestamp option), only if the corresponding IP-options field appears fully populated (FULL).

In one embodiment of the present disclosure, the IP Record Route option field is utilized to store the mapping information (i.e. the source IP address and the source port number) designating the source computing node as the origin endpoint of the IP datagram. The Record Route option, as the name suggests, facilitates recording the route (path) of the IP datagram. Conventionally, the Record Route option is used to record the IP address of the respective NAT devices (for example, gateways) that handle the IP datagram as it propagates from the source computing node to the destination computing node. Preferably, a gateway, on receiving the IP datagram, determines if the Record Route option is present within the IP header of the IP datagram. If the Record Route option is determined to be present, then the gateway inserts its own IP address (IP address assigned to the gateway; also referred to as NAT device's IP address), beginning at the octet (byte) pointed to by the pointer, causing the pointer to be incremented by 'four'. Typically, the 'pointer' of the Record Route option always points to the next byte at which a NAT device's IP address is to be inserted/appended.

For instance, when the IP datagram is routed through two gateways, the first gateway processes the IP datagram and inserts into the IP Record Route option and more specifically into the 'Route Data' space of the Record Route option, it's IP address (for instance, a 'First gateway IP address') and subsequently increments the value of the 'pointer' subfield by 'four'—such that the pointer points to the next memory location of the Route Data space available for storing a gateway's IP address—before transmitting the IP datagram to a second gateway. The second gateway receives the IP datagram from the first gateway and subsequently processes the received IP datagram to determine if Record Route option is present within the header of the IP datagram. If the Record Route option is determined to be present, then the second gateway inserts its IP address (for instance, a 'second gateway IP address') into the Record Route option, and more specifically into the memory location referenced by the pointer post the increment thereof. Accordingly, the IP datagram having been routed through two gateways, incorporates 'two' IP addresses of respective gateways within the Record Route option, and more specifically within the 'route data' sub-field thereof.

It is well known that version 4 of the IP standard (IPv4) describes the IP-options field as having a size of 'forty' bytes, be it the IP Record Route option or the IP Internet Timestamp option. Referring to the IP record Route option, it is well known that the Record Route option begins with the octet 'option type'. The second octet is a 'length' subfield and the third octet is a (the) 'pointer' subfield. The third octet is typically followed by 'Route Data' space. The 'option-type', 'length' and 'pointer' occupy 'one' octet (byte) each, with the remaining 'thirty-seven' bytes, capable of accommodating a maximum of 'nine' IP address measuring 'four' bytes each, being available for the gateways (NAT devices) to insert their respective IP addresses (NAT devices' IP Addresses). Given the total size of the IP-options field, it is obvious that the 'Route Data' space of the Record Route option is capable of holding a maximum of 'Nine' IP addresses in 32-bit format. However, if the value of the 'pointer' (subfield) is greater than the value associated with the 'length' (subfield), i.e. the 'pointer' points to a memory space beyond the last possible entry in the route data space, then the intermediary gateway(s) is/are obligated to conclude that the Record Route option is FULL and consequentially abstain from inserting their respective IP address (NAT devices' IP addresses) into the Record Route option, and forward transmit the IP datagram without inserting the relevant NAT devices' IP addresses into the Record Route option.

In accordance with another embodiment of the present disclosure, the IP Internet Timestamp option field is utilized to store the mapping information (i.e. the source IP address and the source port number) designating the source computing node as the origin endpoint of the IP datagram. The Internet Timestamp option, as the name suggests, is used to record the time (in Universal Time; UT) at which an Internet router (for example, a gateway) receives the IP datagram during the latter's journey on a network path from the source computing node to the destination computing node. Conventionally, the Internet Timestamp option develops a list of IP address identifying each gateway traversed by the IP datagram, and the time duration (in UT; referred to as timestamp) indicative of the time taken for the IP datagram to cover the distance between consecutive gateways on the network path.

Similar to the IP Record Route option, the total size of the Internet Timestamp option is also 'Forty' bytes. Similar to the Record Route option, the Internet Timestamp option also begins with the octet 'option type', followed by 'length' subfield and the 'pointer' subfield (both being octate). The forth octate in case of the Internet Timestamp option is the combination of 'flag' and 'overflow' subfields which in turn are followed by the 'Timestamp Data' space. As described above, the 'option-type', 'length', 'pointer', and the combination of 'flag' and 'overflow' occupy 'one' octet (byte) each, with the remaining 'thirty-six' bytes being rendered available for manipulation by the gateways situated along the network path between the source computing node and the destination computing node. Conventionally, a maximum of 'four' IP addresses assigned to respective gateways can be inserted into the 'Timestamp Data' space, followed by insertion of a maximum of 'four' timestamps indicative of the (respective) time at which the IP datagram was handled by each of the (four) gateways, provided each of the IP addresses and the timestamps are 'four' bytes long respectively.

Even in the case of the Internet Timestamp option, with the 'pointer' always pointing to the 'byte' location (of the Timestamp Data space) indicating the beginning of (memory) space for the insertion of next timestamp (by a subsequent NAT device, i.e. gateway), if the 'pointer' is greater than the 'length', i.e. the 'pointer' is interpreted as pointing to a memory location situated beyond the last possible entry space, then any intermediary gateway(s) remaining untraversed on the network path between the source computing node and the destination computing node are obligated to conclude that the Internet Timestamp option is FULL, and consequentially abstain from inserting their own IP addresses (NAT devices' IP addresses) and timestamps into the Internet Timestamp option, and forward transmit the IP datagram without inserting the timestamps and the NAT devices' IP addresses into the Internet Timestamp option (of the IP datagram).

In view of the foregoing, it is apparent that one of the essential characteristics of the IP-options field (the Internet Timestamp option as well as the Record Route option) is that the said (IP-options) field is left unaltered, and no NAT device IP address (in case of the Record Route option) or a combination of the NAT device IP address and the timestamp (in case of the Internet Timestamp option) is inserted thereto during the transmission of the IP datagram, if the intermediary gateway(s) find the IP-options field of the IP datagram to be fully populated (FULL).

The computer implemented method, the corresponding computer implemented system and the computer program product envisaged by the present disclosure teach using the aforementioned essential characteristic of IP-options—the Internet Timestamp option as well as the Record Route option—in routing an IP datagram from a source computing node to a destination computing node via one or more intermediary gateways, but without allowing the intermediary gateway(s) to insert neither their respective IP addresses (NAT device IP addresses) nor the combination of their respective IP addresses and corresponding timestamps into the IP-options field, and instead using the IP-options field to store the mapping information (including the source IP address and the source port number) in a non-manipulable manner such that the mapping information could be rendered available for processing at the destination computing node, for identification of the source computing node as the origin endpoint of the IP datagram, thereby facilitating implementation of an effective micro-segmentation policy at the destination computing node, which in turn compulsorily necessitates, at the destination computing node, availability of the mapping information (i.e. the source IP address and source port number corresponding to the received IP datagram) linking the received IP datagram to the source computing node, in order to determine whether the said IP datagram is generated from a trustful endpoint (i.e. the source computing node in this case).

As described hitherto, the computer implemented method, the corresponding computer implemented system and computer program product envisaged by the present disclosure teach passing off the IP-options field of the IP datagram as being fully populated (FULL), thereby preventing the intermediary gateway(s) from inserting their respective IP addresses (NAT device IP addresses) or the combination of the respective IP addresses and corresponding timestamps thereto, and instead using the IP-options field to store, in a manner clandestine and non-manipulable to the intermediary gateways, the mapping information (including the source IP address and source port number) linking the respective EP-datagram back to the corresponding source computing node, thereby enabling the network path of the IP datagram to be traced back all the way to the source computing node.

The computer implemented method and the corresponding computer implemented system and computer program product envisaged by the present disclosure also provide for anticipating the default behaviour of the gateways which involves inserting their own IP addresses (NAT device IP addresses) or a combination of the NAT device IP addresses and corresponding timestamps, into the IP-options field of the IP datagram, when the latter traverses the network path between the source computing node and the destination computing node.

The present disclosure and in turn the method, system and computer program product envisaged therein also teach storing the source IP address and source port number of the IP datagram in a nonmanipulable manner within the IP datagram itself (i.e. within the IP-options field of the IP datagram), thereby counteracting the phenomenon of the 'source address' and 'source port number' fields of the IP header being manipulated by the intermediary gateways with the addition of respective translated IP addresses and translated port numbers thereto. Further, the method, system and computer program product envisaged by the present disclosure also counteract the phenomenon of intermediary gateways manipulating the IP-options field of the IP datagram by inserting their own IP addresses (NAT devices' IP address) thereto, by the way of passing-off the IP-options field (and specifically the 'route data' subfield of the Record Route option and the Timestamp Data' subfield of the Internet Timestamp option) as being fully populated (FULL).

Further, the method, system and computer program product envisaged by the present disclosure facilitate effective and seamless implementation of micro-segmentation (at the destination computing node) which includes inter-alia classifying an incoming IP datagram as legitimate or otherwise and making a decision about either dropping the incoming IP datagram or forwarding the incoming IP datagram to an alternative destination, based on the mapping information (source IP address and source port number) stored within the IP datagram and linking the IP datagram to its origin endpoint (i.e. the source computing node).

DETAILED DESCRIPTION

Figure 1:
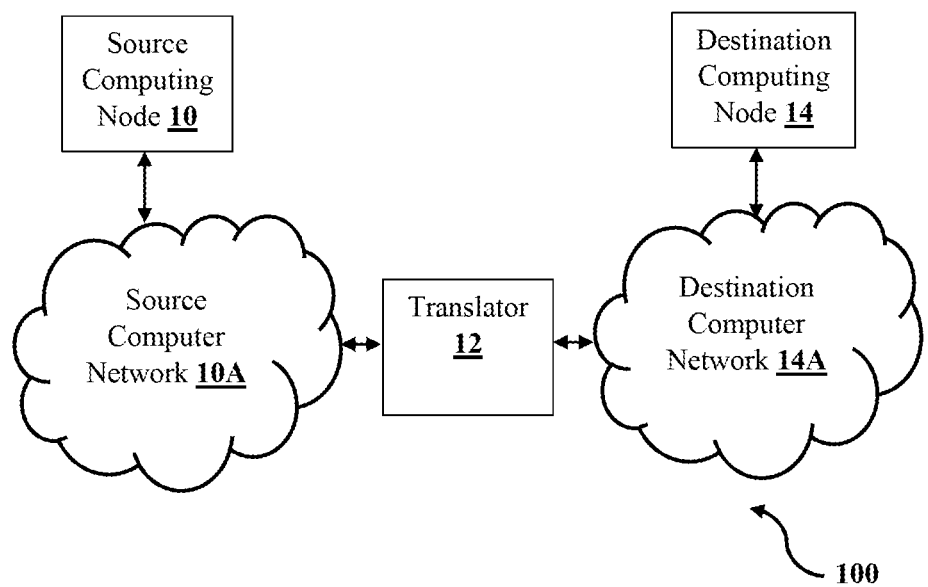
FIG. 1 illustrates an exemplary computer network comprising a source computing node communicably coupled to a destination computing node via a Network Address Translation (NAT) device, in accordance with the present disclosure.

Referring to FIG. 1 there is shown an exemplary network environment 100 comprising at least one 'source computing node' 10 communicably coupled to at least one 'destination computing node' 14 via at least one NAT device 12 (the NAT device 12 referred to as 'translator' and exemplified as a gateway hereafter). For the sake of explanation, the source computing node 10 is described to be a part of a source computing network 10A, while the destination computing node 14 is described to be a part of a destination computer network 14A. The translator 12 as described above is configured to facilitate connection between the source computing node 10 and the destination computing node 14. In accordance with the present disclosure, the translator 12 is a sufficiently configured network address translator capable of remapping at least the address space associated with the source computing node 10 to the address space associated with the destination computing node 14.

The translator 12 (a NAT device; a gateway) is operable to facilitate mapping of a 'source network address' associated with the source computer network 10A to a 'destination network address' associated with the destination computer network 14A, so as to facilitate a seamless communication between the source computing node 10 (which is communicably coupled to the source computer network 10A) and the destination computing node 14 (which is communicably coupled to the destination computer network 14A). Preferably, the translator 12 is allocated a plurality of 'external network addresses', which are in turn used (by the translator 12) to enable an IP datagram emanating from the source computing node 10 to be uniquely identified (only) on at least one external network (not shown in figures) which in turn routes the IP datagram through to the destination computer network 14A. Further, in this case, the external network is communicably coupled to the destination computer network 14A via a corresponding gateway, which in turn is allocated its own quota of 'external network addresses' usable in uniquely identifying the IP datagram only on the destination computer network 14A.

Typically, whenever the source computing node 10 desires to communicate with the destination computing node 14 by the way of transmitting an IP datagram thereto, the translator 12 assigns an 'external network address' to the source computing node 10 for a period of time sufficient to route the IP datagram through to the destination computing network 14A via at least one external network; with the external network address facilitating unique identification of the IP datagram across the external network. Typically, the 'external network address' thus assigned to the outgoing IP datagram replaces the 'source network address' (source IP address) corresponding to the 'outgoing' IP datagram, thereby uniquely identifying the outgoing IP datagram on the external network communicably coupled to the destination computer network 14A.

It is also routine that the translator 12 additionally translates a corresponding 'source port number' into an 'external port number' so as to facilitate proper routing of the 'return traffic' (for instance, response messages) to the appropriate (initiating) source computing node 10. In the scenario described above, since the 'source network address' and 'source port number' are translated into corresponding 'external network address' and 'external port number' respectively, the 'external network address' and 'external port number' are also referred to as 'translated IP Address' (NAT'ed IP address) and 'translated port number' (NAT'ed port number) respectively.

However, the phenomenon of the translator 12 replacing the 'source IP address' and the 'source port number' with the 'translated IP address' and 'translated port number' proves to be a deterrent for implementation of micro-segmentation across the network environment 100. Typically, the phenomenon of micro-segmentation involves creating fine-grained security policies that can be specifically tailored to suit the requirements of individual constituents (individual computer nodes) of the network environment 100. Typically, micro-segmentation facilitates creation of 'workload level' security policies which in turn can be conceptualized specifically for individual computing nodes based on inter-alia the 'data sensitivity and application sensitivity associated with individual computing nodes', 'access permissions associated with individual computing nodes' and 'the interconnectivity regulations applicable to each of the computing nodes'.

One of the major advantages of micro-segmentation is that it creates fine-grained security policies which when executed limit application and network flows between individual computing nodes to those which are explicitly permitted, thereby transforming the (traditional) network environment into a zero-trust network environment wherein data communications between individual computing nodes are enabled subject to continuous monitoring, only if they are explicitly permitted by the corresponding security policies. However, creating such fine-grained security policies and rendering the fine-grained security policies suitable for individual computing nodes, requires any IP datagrams directed to individual computing nodes to be profiled on the basis of the corresponding 'source IP address' and 'source port number', before being labelled as either legitimate and consequentially trustful or as untrustful and consequentially a network-security threat. However, the phenomenon of the translator 12 replacing the 'source IP address' and 'source port number' of an outgoing IP datagram with the 'translated IP address' and 'translated port number' is a serious detriment to the implementation of micro-segmentation since it is impossible for a 'policy controller' resident on the destination computing node, to profile the 'incoming' IP datagram on the basis of the 'source IP address' and 'source port number', given the fact that the 'source IP address' and 'source port number' have already been replaced with the translated IP address and translated port number, thereby making it impossible for the (network path of the) IP datagram to be traced beyond the translator 12. The non-availability of 'source IP address' and 'source port number' of an incoming IP datagram in view of the combination being replaced by corresponding translated IP address and translated port number, and the inability (on the part of the resident policy controller) to trace the network path of the incoming IP datagram beyond the translator 12, causes serious impediments for execution of micro-segmentation on computing nodes connected to a plurality of other computing nodes via the (network address) translator 12.

Therefore, in order to facilitate seamless implementation of micro-segmentation, even on network environments having a plurality of computing nodes interconnected via one or more network address translators (NAT devices/gateways), the present disclosure envisages a computer-implemented method (and a corresponding computer-implemented system and computer program product) that anticipates the default behaviour of the (network address) translator 12—which includes replacing the source IP address and the source port number (mapping information) stored in the IP header of the IP datagram originating from the source computing node, with a translated (NAT'ed) IP address and translated (NAT'ed) port number—and counteracts the default behaviour of the translator 12 by storing a replica of the source IP address and source port number within the IP datagram in a non-manipulable manner, in order to facilitate effective implementation of micro-segmentation on the destination computer network. The computer-implemented method (and a corresponding computer-implemented system and computer program product) envisaged by the present disclosure provides for trustful and non-repudiable verification of the source computing node as the creator of the IP datagram, by the way of preserving the source IP address and source port number identifying the source computing node 10 as the creator of the IP datagram, in the IP-options field of the IP datagram.

As discussed hitherto, the computer-implemented method (and the system and computer program product) envisaged by the present disclosure proposes an effective countermeasure to the phenomenon of the source IP address and source port number (stored within an IP header) of the IP datagram being replaced by a translated IP address and translated port number whenever the IP datagram is routed via the Network Address Translator 12, by facilitating preservation of the source IP address and source port number in an IP-options field of the IP datagram in a non-changeable, non-replaceable manner, such that the information identifying the source IP address and source port number is available at the destination computer network, despite the IP datagram being routed through (at least one) translator 12 before reaching the destination computing node 14, and even when the translator 12 manipulates the IP header of the said IP datagram by replacing the source IP address and source port number stored therein with the Translated IP address and Translated port number.

Figure 2:
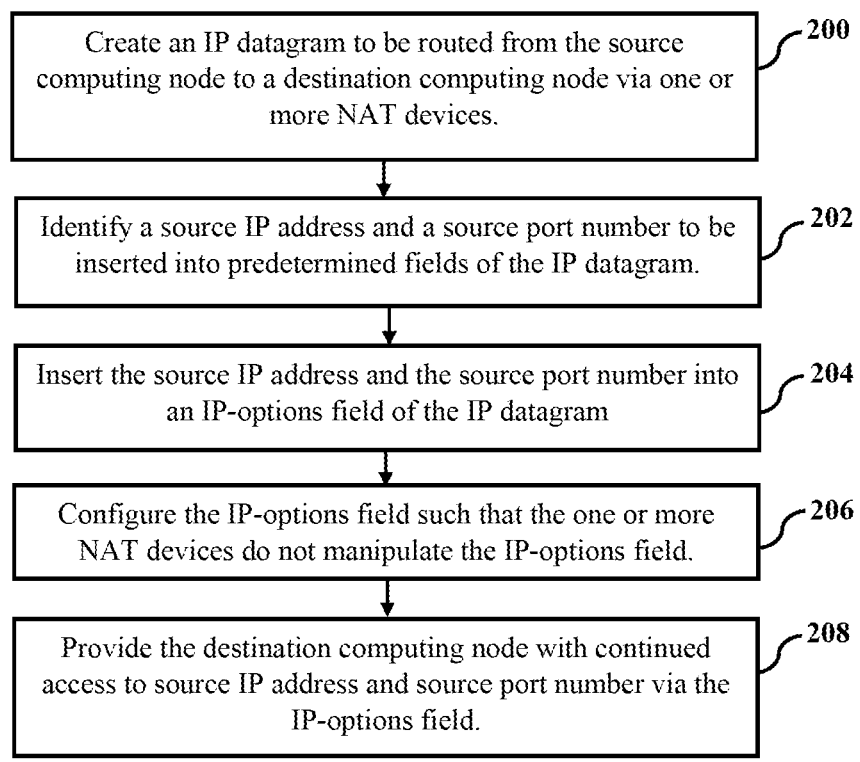
FIG. 2 illustrates a flowchart describing the steps involved in the computer-implemented method for inserting mapping information corresponding to the IP datagram in an IP-options field of the said IP datagram, in accordance with the present disclosure.

Referring to FIG. 2, there is shown a flowchart describing the steps involved in the (computer-implemented) method for inserting mapping information corresponding to the IP datagram in an IP-options field of the said IP datagram. The method begins at step 200 where a network packet is created by the source computing node (denoted by reference numeral 10 in FIG. 1). The source computing node 10 is preferably one of a desktop computer, laptop computer, Personal Digital Assistant (PDA) capable of supporting at least packet based communications and connections. The source computing node 10 is configured to create digitally encoded information and further arrange the digitally encoded information in the form of network packets, prior to transmission thereof across a (connection-oriented packet switching) network, for rendering a variety of communication services including but not restricted to file transfers, email messaging, internet browsing, gaming services, and content streaming. The network packets created by the source computing node 10 are designated to be transmitted to the destination computing node (denoted by reference numeral 14 in FIG. 1), thereby allowing the source computing node 10 to communicate with the destination computing node 14 via exchange of the IP datagram.

In accordance with the present disclosure, every network packet created by the source computing node 10 includes a 'header' portion and a 'payload' portion; with the 'header' portion incorporating the information describing the characteristics of the underlying network packet, and the 'payload' portion incorporating the data to be transmitted (to the destination computing node 14). Typically, the network packet traverses the TCP/IP protocol stack incorporated within the source computing node 10 before being transmitted across a computer network (not shown in figures) to the destination computing node 14. Typically, the network packet is processed at first by the transport layer (of the TCP/IP protocol stack incorporated within the source computing node 10), which in turn identifies a port—a dedicated location in memory for sending /receiving data.

In this case, the transport layer identifies at least a source port' necessary for sending the data (incorporated within the 'payload' portion), and the information corresponding to the source port, i.e. the 'source port number', is added on to the 'TCP header' of the network packet. Preferably, at the transport layer, the TCP header constitutes the 'header portion' while the 'data' to be transmitted to the destination computing node 14 constitutes the 'payload portion'. Typically, when the network packet (generated by the source computing node 10) is processed at the transport layer, a TCP header specifying a 'source port' (source port used for sending the network packet; also referred to as 'source port number') is appended onto the network packet. The TCP header typically measures 'twenty' bytes in size, with the source port number field occupying 'two' bytes, and a destination port number field occupying 'two' more bytes. Typically, the source port number and the destination port number fields identify the communication end-points for the sending device (i.e. the source computing node 10 in this case) and the receiving device (i.e. the destination computing node 14 in this case) respectively. Subsequently, the network packet comprising the TCP header and the data is transmitted to the Internet layer.

Typically, the network packet (comprising the TCP header and the data) is received by the Internet layer (of the TCP/IP protocol stack incorporated within the source computing node 10), which, on its part prepares the received network packet for delivery to the destination computing node 14, by the way of formatting the network packet into an IP datagram, and by further attaching an IP header to the network packet as a part of such a transformation. Typically, the internet layer processes the network packet and adds an IP header on top of the TCP header, prior to converting the network packet into an IP datagram. Therefore, post the transformation by the internet layer, the IP datagram incorporates an IP header as well as the TCP header and the data to be delivered to the destination computing device 14.

As described above, during the conversion of the network packet into an IP datagram, the IP header is added to the network packet, on top of (in addition to) the TCP header and the data received from the transport layer. Preferably, the IP header includes the fields 'source address', 'destination address' and 'IP-options' which are particularly relevant to the implementation of the method described in the present disclosure. The 'source address' field of the IP header, as the name suggests, stores a 32-bit address indicative of the origin endpoint of the network packet, i.e. the source computing node 10 (referred to as 'source IP address' hereafter). Similarly, the 'destination IP address' field of the IP header, as the name suggests, stores a 32-bit address indicative of the destination endpoint of the network packet, i.e. the destination computing node 14. Further, the 'IP-options' field is an optional field which is used in accordance with the present disclosure to store, in a non-manipulable manner, the 'source IP address' and 'source port number' identifying the origin endpoint of the network packet (i.e. the source computing node 10), thereby marking a significant deviation from the conventional use of the IP-options field which included storing within the IP-options field, at least the information indicative of the route taken by the corresponding IP datagram to travel from the source computing node 10 to the destination computing node 14 (in case of the IP Record Route option), and the information indicative of the translators/gateways that processed the IP datagram en route to the destination computing node 10 and the time at which each of the translators/gateways processed the IP datagram (in case of the IP Internet Timestamp option).

Referring again to the TCP/IP protocol stack incorporated within the source computing node 10, the IP datagram created at the internet layer is subsequently formatted into a corresponding 'frame' at the Data-Link Layer (of the TCP/IP protocol stack incorporated within the source computing node 10), before being sent out (by the physical layer; which is also a part of the TCP/IP protocol stack incorporated within the source computing node 10) on the computer network to be transmitted to the destination computing node 14. It is pertinent to note that the explanation provided herein concentrates only on those procedures/steps which are relevant to the context of the present disclosure. While it is acknowledged that the network packet would typically undergo a multitude of procedures/steps, such procedures/steps have been omitted for the sake of brevity since such procedures/steps are deemed as not being relevant to the scope of the present disclosure.

In accordance with the present disclosure, execution of the step 202 begins when the network packet incorporating the TCP header is processed at the Internet layer culminating in the addition of the IP header onto the network packet and transformation of the network packet into a (the) corresponding IP datagram. At step 202, firstly, the 'source port number' and the 'source IP address' incorporated in the IP datagram are extracted. In one embodiment of the present disclosure, a special socket is created for passing the network packet from the kernel space (kernel space being the space where the core of the operating system—the kernel—executes) to the user space (user space representing a set of memory locations where all the user processes are executed). The socket is configured to trap the network packet under execution in the Kernel space, at a specific point in the TCP/IP protocol stack, preferably at the Internet layer, and move the trapped network packet through to the user space thereby at least temporarily preventing the TCP/IP protocol stack from executing the network packet. Subsequently, the network packet which has been redirected into the user space is operated upon (preferably by a pre-defined software application) in order to copy the 'source port number' and the 'source IP address' from the TCP header and the IP header of the network packet respectively. Subsequently, the 'source port number' and the 'source IP address' derived from the TCP header and the IP header of the network packet are inserted into the IP-options, field, post which the network packet is injected into the kernel space from the user space, and into a predesignated point (preferably the Internet Layer) in the TCP/IP protocol stack for further processing.

Alternatively, a Kernel Hook Module (KHM) which is configured to interrupt and modify the system calls designated to the kernel space such that the system calls are redirected to predefined sub-modules/procedures embodied with the KHM, could be used in order to at least temporarily interrupt the processing of the network packet on the TCP/IP protocol stack, and redirect the network packet to pre-defined sub-modules/procedures embodied with the KHM, such that the 'source port number' and the 'source IP address' embodied within the TCP header and the IP header of the network packet are copied and inserted into the IP-options field.

Alternatively, in case of an open source operating system such as the LINUX, pre-defined functions defining the IP ingress traversal logic are usable for either delivering datagrams to higher level protocols or for forwarding datagrams to other hosts. Such functions typically incorporate sub-functions and hooks that are configured to process any incoming datagram. Accordingly, such predefined functions (for instance, functions incorporated in a LINUX source file 'ip_input.c') could be used to capture and analyze the IP header of an incoming datagram and extract the 'source port number' and the 'source IP address' therefrom, before copying the extracted 'source port number' and the 'source IP address' into the IP-options field.

At the step 202, the 'source port number' and the 'source IP address' which in turn indicate the source computing node 10 as the creator of the said IP datagram are extracted—preferably copied—from the IP header of the IP datagram, using either of the three phenomena described above. Further, the 'source port number' and the 'source IP address' thus copied are subsequently inserted into the IP-options field of the said IP datagram, thereby causing the IP datagram to maintain two replicas of the 'source port number' and the 'source IP address'; with the first of the replicas being visible to every layer of the TCP/IP protocol stack of the source computing node 10 as well as the destination computing node 14, and the second replica being stored in the IP-options field of the IP-header, in a non-manipulable manner so as to counteract the phenomenon of one or more translators (12)—entrusted with transmitting the IP datagram from the source computing node 10 to the destination computing node 14—replacing the 'source port number' and the 'source IP address' stored in the IP-header with the translated IP address and translated port number.

Typically, the translator 12 functioning as an intermediary between the source computing node 10 and the destination computing node 14, receives and processes every IP datagram directed to the destination computing node 14. As a part of the well-established default processing mechanism, the translator 12 manipulates the 'source IP address' and the 'source port number' fields of the IP header corresponding to the received IP datagram, and replaces the 'source IP address' and the 'source port number' stored therein with translated IP address and translated port number respectively. This behaviour on the part of the translator 12 which it has been programmed to exhibit by default, is a challenge to preclude since translators (12) are almost irreplaceable given an everlasting need to facilitate data transfer and information sharing between computer nodes situated across geographically dispersed, discrete computer networks. However, while it is always a challenging task to prevent the translator 12 from replacing the 'source IP address' and 'source port number' embedded within the IP header of the (received) IP datagram, with the corresponding translated IP address and translated port number, the availability of appropriate mapping information (i.e. the 'source IP address' and 'source port number') within the IP datagram for linking the IP datagram to the origin endpoint thereof and thereby tracing the network path of the IP datagram is an unavoidable prerequisite for implementation of micro-segmentation.

As discussed above, in order to facilitate effective implementation of micro-segmentation, it is imperative that the 'source IP address' and the 'source port number' identifying the origin endpoint (i.e. the source computing node 10 in this case) of the IP datagram are preserved, preferably within the IP datagram itself in a non-manipulable manner, so that the IP datagram despite being routed via at least one translator 12 retains the Mapping information (i.e. the 'source IP address' and 'source port number') that would allow for the IP datagram to be traced back to the origin endpoint thereof, i.e. the source computing node 10. The mapping information preserved within the IP datagram enables a micro-segmentation controller (referred to as 'controller' hereafter; and not shown in figures) installed within the destination computing node 14 to extract and subsequently process the mapping information, and consequentially determine the origin endpoint of the IP datagram based on the mapping information, and arrive at an appropriate PACKET DROP or PACKET ACCEPT decision based on predefined micro-segmentation policies specifying the actions/decisions to be implemented in respect of IP datagrams determined to be emanating from the said origin endpoint.

However, as discussed earlier, the translator 12, by virtue of its default behaviour replaces the 'source IP address' and 'source port number' (incorporated within the IP header) of the IP datagram with a translated IP address and translated port number, thereby causing a serious detriment to the implementation of micro-segmentation policies, since it becomes impossible for the micro-segmentation controller to profile the IP datagram as having been originated from a trustful source computing node (10) and to trace the network path of the IP datagram beyond the translator 12, since the 'source IP address' and 'source port number' categorically identifying the source computing node 10 as the source (origin endpoint) of the IP datagram have already been replaced with the translated IP address and translated port number, by the translator 12.

Therefore, in order to anticipate this default behaviour of the translator 12, the method envisaged by the present disclosure proposes a step 204 wherein the IP-options field of the IP datagram is programmed (preferably by a specially programmed computer processor installed within the source computing node 10) such that the 'source IP address' and the 'source port number' stored within the IP-options field are rendered non-manipulable, and the translator 12 forwards the IP datagram to the destination computing node 14 without manipulating the IP-options field and without tampering the 'source IP address' and the 'source port number' stored within the IP-options field, by appending its own IP address (NAT device IP address), thereby marking a significant deviation from its default behaviour, which would have otherwise included a manipulation of the IP-options field (by the translator 12) and subsequent addition of the IP address assigned to the translator 12 (NAT device IP address) into the IP-options field—the NAT device IP address appended normally to the 'source IP address' and 'source port number' (previously) stored within the IP-options field, and such an appendment of the NAT device IP address to the memory segment storing the 'source IP address' and 'source port number' likely to render the memory segment non identifiable and therefore non-processable to the policy controller (installed within the destination computing node 14), given the presence of additional information in the form of NAT device IP address.

Conventionally, soon after receiving an incoming IP datagram, the translator 12 processes inter-alia the 'source port number' and 'source IP address' fields of the corresponding IP header and replaces the 'source port number' and 'source IP address' stored therein (within the namesake fields of the IP header) with the translated IP address and translated port number respectively. The manipulation of the 'source port number' and 'source IP address' fields (of the IP header) and the replacement of 'source port number' and 'source IP address' with translated port number and translated IP address constitutes the default behaviour of the translator 12. Additionally, the translator 12 also checks the corresponding IP header for the availability of the IP-options field, as well as the type of the IP-options field. If the IP-options field present within the IP header is determined to be a Record Route option field, then the translator 12 processes the Record Route option and inserts its IP address (i.e. the translator's IP address; also referred to as 'NAT device IP address') thereto. Alternatively, If the IP-options field present within the IP header is determined to be an Internet Timestamp option field, then the translator 12 inserts its IP address (NAT device IP address) and a timestamp indicative of the time at which the IP datagram was processed by the translator 12, into the Internet Timestamp options field.

In accordance with the present disclosure, implementation of step 204 entails storing the 'source IP address' and 'source port number' (mapping information facilitating identification of the source computing node 10 as the origin endpoint of the IP datagram) in the IP-options field, and making the translator 12 believe that the IP-options field storing the 'source IP address' and 'source port number' is FULL, and therefore preventing the translator 12 from manipulating the IP-options field by the way of appending it's own IP address (the NAT device IP address) thereto. It follows that when the translator 12 is made to believe that the IP-options field is FULL, it (the translator 12) abstains from manipulating the IP-options field and forward transmits the corresponding IP datagram after manipulating only the 'source IP address' and 'source port number' fields of the IP header and replacing the 'source IP address' and 'source port number' stored in the IP header with the corresponding translated IP address and translated port number, but without manipulating the IP-options field (of the IP header) and without inserting its own IP address (translator's IP address or NAT device IP address) thereto.

In accordance with the present disclosure, the step 204 is explained in further detail by considering the IP Record Route option as an example. As known in the art, the Record Route option field is typically used to record the EP addresses of the routers (gateways, translators) that handle the transmission of the IP datagram from the source computing node 10 to the destination computing node 14. Taking into consideration the presence of at least one translator (12) on the network data path between the source computing node 10 and the destination computing node 14, it is obvious that the Record Route option when processed and manipulated by the translator 12 would incorporate the IP address assigned to the translator 12 (NAT device IP address).

As known in the art, whenever the translator 12 processes an IP datagram incorporating the Record Route option field, it (the translator 12) inserts its own IP address (i.e. the NAT device IP address/translator IP address) into the 'record route data' subfield of the Record Route option field and increments the 'pointer' by 'four' such that the pointer points to the next byte sized memory location available for storing any subsequent NAT device IP addresses (which might belong to any other translators situated in between the source computing node 10 and the destination computing node 14).

However, since the steps 200 and 202 explained above propose storing the 'source IP address' and 'source port number' (indicating the 'source computing node' 10 as the origin endpoint of the IP datagram) within the IP Record Route option field, it is imperative that the translator 12 is prevented from manipulating the Record Route option field so as to consequentially prevent appending of the NAT device IP address to the memory segment—corresponding to the IP-options field, and more specifically to the 'Route Data' subfield—storing the 'source IP address' and 'source port number', and thereby nullifying the possibility of such an appendment causing the 'source IP address' and 'source port number' stored within the said memory segment to be rendered non-identifiable and therefore non-processable to the policy controller (installed within the destination computing node 14), on account of presence of additional information in the form of NAT device IP address. In order to prevent the translator 12 from manipulating the Record Route option field and consequentially appending the NAT device IP address to the previously stored the 'source IP address' and 'source port number', it is imperative that the Record Route option field is (always) projected to the translator 12 as being fully populated (FULL).

Therefore, at step 204, in order to project the Record Route option field as being FULL, the IP datagram is processed by a specially programmed computer processor (not shown in figures) installed within the source computing node 10, prior to the out-bound transmission of the IP datagram via the computer network and to the translator 12. The computer processor preferably extracts the 'source port number' and the 'source IP address' from the corresponding namesake fields of the IP header and inserts them into the Record Route option field. As discussed earlier, either a pre-programmed Kernel Hook Module (KHM), or a pre-programmed socket or a pre-defined computer executable function is implemented by the computer processor to firstly extract the 'source port number' and the 'source IP address' from the corresponding namesake fields of the IP header, and to subsequently insert them into a predefined subfield (Route Data subfield in case of Record Route option) of the IP-options field.

Typically, the Record Route option field (in case of Internet Protocol version 4; IPv4) is 'forty' bytes long, with the first octet reserved for 'option type', and the second octet and the third octet reserved for 'length' and 'pointer' respectively. Further, the third octet is typically followed by 'Route Data' subfield. The 'option-type', 'length' and 'pointer' occupy 'one' octet (byte) each, i.e. 'three' bytes in total, with a remainder of 'thirty-seven' bytes capable of accommodating a maximum of 'nine' IP address measuring 'four' bytes each being available for translators/gateways (present along the network path connecting the source computing node 10 to the destination computing node 14) to insert their own IP addresses (NAT device IP addresses/translator IP addresses). However, in this case, the 'source IP address' and the 'source port number' inserted (into the Route Data subfield of the IP Record Route option field) by the computer processor occupy 'four' bytes and 'two bytes' respectively, thereby resulting in a total of 'nine' out of 'forty' bytes being occupied by the combination of 'option type', 'length', 'pointer', 'source IP address' and 'source port number'. Accordingly, the Record Route option in this case is left with 'thirty-one' unused byte spaces which could potentially accommodate 'seven' more IP addresses measuring 'four' bytes each.

In accordance with the present disclosure, the objective of step 204 is to manipulate the Record Route option—after storing the 'source port number' and 'source IP address' therein—in such a way that the 'thirty-one' vacant byte spaces are rendered unavailable for translator 12 and that the Record Route option field appears FULL (at least) to the translator 12. Accordingly, the computer processor programs the 'length' subfield to hold the value 'nine', with the 'length' subfield denoting the total value of the Record Route option field, and the value 'nine' indicating the total number of bytes consumed by the combination of 'option-type' (one byte), 'length' (one byte), 'pointer' (one byte), 'source IP address' (four bytes) and 'source port number' (two bytes). Subsequently, on the basis of the value of the 'length' subfield, the computer processor also programs the 'pointer' subfield and increments the value of the pointer from 'zero' to 'ten' (conventionally, the value of pointer would have been incremented by 'four' subsequent to the insertion of a four-byte NAT device IP address by the translator 12) thereby explicitly configuring the value of the 'pointer' to be greater than the value associated with the 'length' subfield of the Record Route option—which in turn serves as the criteria for projecting the Record Route option field as FULL—as illustrated in step 206A of FIG. 2A.

Figure 2A:
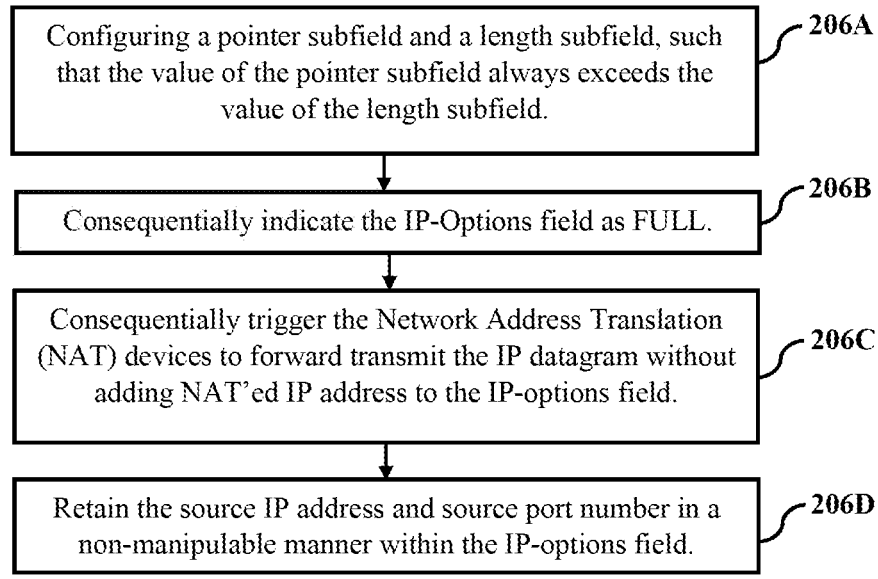
FIG. 2A illustrates a flowchart describing the steps involved in the computer-method for configuring the IP-options field such that the NAT devices do not manipulate the IP-options field.

Conventionally, the translator 12, subsequent to receiving the IP datagram from the source computing node 10, checks inter-alia for the presence of the IP Record Route option field. If the record route option is determined to be present, then the translator 12 inserts its own IP address, i.e. the NAT device IP address, into the route data space of the record route option and increments the 'pointer' by 'four' such that the pointer points to the next byte sized memory location assigned to the record route option field for storing any subsequent IP addresses (which might belong to any other intermediary translators situated in between the source computing node 10 and the destination computing node 14). However, if the translator 12, subsequent to processing the 'length' and 'pointer' subfields of the Record Route option determines that the value stored in the 'pointer' subfield is greater than the value stored in the 'length' subfield, i.e. the 'pointer' points beyond the last possible memory location available for storing IP addresses as a part of the route data (Step 206A; FIG. 2A), then the translator 12 concludes that the Record Route option corresponding to the said IP datagram is FULL (Step 206B; FIG. 2A) and consequentially abstains from inserting its own IP address (NAT device IP address) into the corresponding route data space, and forward transmits the IP datagram without inserting its IP address (i.e. the NAT device IP address) into the Record Route option (Step 206C; FIG. 2A), thereby taking a significant deviation from its default behaviour, and thereby providing for the 'source IP address' and 'source port number' to be retained in a non-manipulable manner within the IP-options field of the IP datagram (Step 206D; FIG. 2A).

Referring again to step 204, since the computer processor installed within the source computing node 10 has specifically programmed the 'pointer' subfield to exceed the value stored in the 'length' subfield, the translator 12 on its part determines the Record Route option field of the IP datagram to be FULL, and accordingly abstains from inserting its own IP address (NAT device IP address) into the corresponding Route Data space (subfield), and consequentially from appending the NAT device IP address on to the 'source IP address' and 'source port number' (constituting the mapping information useful in tracing the IP datagram back to the origin, i.e. source computing node 10, and profiling the IP datagram based on the origin thereof) stored therein.

In accordance with the present disclosure, even though the translator 12 is tricked into concluding that the Record Route option is FULL, the fact that the translator 12 abstains from inserting its own IP address (NAT device IP address) into the corresponding Route Data space, and consequentially from appending the NAT device IP address onto the 'source IP address' and 'source port number' previously incorporated within the Route data space, thereby marking a significant deviation from its default (conventional and well-known) behaviour, paves the way of effective and efficient implementation of micro-segmentation policies which in turn involves inter-alia inspecting each of the IP datagrams received at respective end-points, profiling each IP datagram based on the 'source IP address' and 'source port number' associated therewith, and deducing appropriate PACKET DROP and PACKET ACCEPT decisions based on the origin endpoints of the IP datagrams.

Further, by preserving the 'source IP address' and 'source port number' for further processing at the destination computing node 14, the method envisaged by the present disclosure facilitates effective and efficient implementation of micro-segmentation policies at the destination computing node 14. As described above, subsequent to being tricked into concluding that the Record Route option is FULL, the translator 12 is obligated to forward transmit the corresponding IP datagram without inserting its IP address (i.e. the IP address assigned to the translator 12; also referred to as NAT device IP address) into the Record Route option field albeit replacing the 'source IP address' and 'source port number' stored within the respective namesake fields of the corresponding IP header. However, even though the translator 12 replaces the 'source IP address' and 'source port number' stored within the 'source IP address' and 'source port number' fields of the IP header, a replica of the 'source IP address' and 'source port number' (constituting the mapping information useful in tracing the IP datagram back to the origin, i.e. source computing node 10) is stored in a non-manipulable manner within the Record Route option field (and specifically within the Route Data subfield of the Record Route option field) of the IP header. Accordingly, when the translator 12 forward transmits the IP datagram to the destination computing node 14, the policy controller installed within the destination computing node processes the IP datagram and retrieves from the Record Route option field the 'source IP address' and the 'source port number' which are in turn used for the implementation of micro-segmentation policies which as described earlier necessitate the availability of mapping information (i.e. the source IP address and source port number) which is in turn used to trace the IP datagram back to the origin endpoint and also to deduce appropriate PACKET DROP and PACKET ACCEPT decisions based on predefined micro-segmentation policies specifying the actions/decisions to be implemented in respect of IP datagrams determined to be emanating from the said origin endpoint.

Figure 2B:
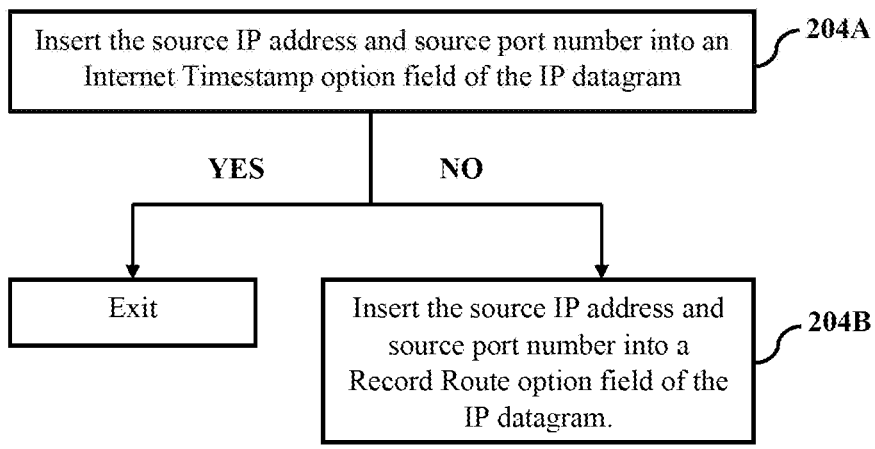
FIG. 2B illustrates a flowchart describing the steps involved in the computer-implemented method for inserting the source IP address and the source port number into the IP Internet Timestamp field or the IP Record Route field of the IP datagram.

In accordance with another embodiment of the present disclosure, step 204 is implemented taking into consideration the Internet Timestamp option instead of the Record Route option. FIG. 2B illustrates a flowchart which describes sub-steps 204A and 204B of step 204, which, in turn, teach selective storing of the source IP address and source port number of the IP datagram either within the IP internet timestamp option field (Step 204A) or within the IP Record Route Option field (Step 204B).

In accordance with the present disclosure, at step 204A, the computer processor (essentially installed within the source computing node 10) checks whether the source IP address and the source port number corresponding to the IP datagram have been inserted into the IP internet Timestamp option of the IP datagram. If the computer processor determines that the IP internet Timestamp option stores the source IP address and source port number of the IP datagram, then the execution of step 204A is terminated. Otherwise, if the computer processor determines that the source IP address and source port number of the IP datagram have not been stored into the IP Internet Timestamp option field, then the computer processor implies an absence of the IP Internet Timestamp option field (within the IP datagram) and consequentially executes step 204B, which, in turn entails storing the source IP address and source port number of the IP datagram with the Record Route option field of the IP datagram, as described in steps 206A-206D.

The Internet Timestamp option is also used to store the IP addresses of the network devices (for instance routers, gateways, translators) that receive and process the IP datagram, in combination with the timestamp indicative of the time when each of the network devices received the IP datagram.

Considering the scenario of the IP datagram being transmitted from the source computing node 10 to the destination computing node 14 via the (at least one) translator 12, it is obvious that the Internet Timestamp option when processed and manipulated by the translator 12 would incorporate the IP address assigned to translator 12, i.e. the translator IP address or the NAT device IP address, and the corresponding timestamp indicating the time when the translator 12 received the IP datagram.

As known in the art, whenever the translator 12 processes an IP datagram incorporating the Internet Timestamp option field, it (the translator 12) inserts its own IP address (i.e. the NAT device IP address or the translator IP address) and the timestamp (indicative of the time when the IP datagram was received by the translator 12) into the 'Timestamp Data' subfield of the Internet Timestamp option field and increments the 'pointer' by 'eight' ('four' bytes accounting for the IP address and 'four' bytes accounting for the timestamp) such that the 'pointer' points to the next byte sized memory location available for storing any subsequent IP addresses and the corresponding timestamps (which might belong to any other translators situated in between the source computing node 10 and the destination computing node 14).

However, since the steps 200 and 202 explained earlier propose storing the 'source IP address' and 'source port number' (indicating the 'source computing node' 10 as the origin endpoint of the EP datagram) within the Internet Timestamp option field, it is imperative that the translator 12 is prevented from manipulating the Internet Timestamp option field so as to consequentially prevent appendment of the (combination of) NAT device IP address and timestamp to the 'source IP address' and 'source port number' stored within the Internet Timestamp option field and more specifically within the 'Timestamp Data' space (subfield) of the Internet Timestamp option field, as such an appendment of the NAT device IP address and timestamp onto the 'source IP address' and 'source port number' normally renders the previously stored source IP address and source port number un-identifiable and consequentially non-processable to the policy controller (on account of presence of additional information in the form of NAT device IP address and timestamp) installed within the destination computing node 14. In order to prevent translator 12 from manipulating the Internet Timestamp option field and consequentially appending the NAT device IP address and timestamp onto the previously stored 'source IP address' and 'source port number', it is imperative that the Internet Timestamp option field is projected to the translator 12 as being FULL.

Therefore, at step 204, in order to project the Internet Timestamp option field as being FULL, the IP datagram is processed by the specially programmed computer processor installed within the source computing node 10, prior to the out-bound transmission of the IP datagram via the computer network and to the translator 12. The computer processor preferably extracts the 'source port number' and the 'source IP address' from the corresponding namesake fields of the IP header (attached to the IP datagram) and inserts them into the Internet Timestamp option field. As discussed earlier, either a pre-programmed Kernel Hook Module (KHM), or a pre-programmed socket or a pre-defined computer executable function is implemented by the computer processor to firstly extract the 'source port number' and the 'source IP address' from the corresponding namesake fields of the IP header, and to subsequently insert them into a predefined subfield (Timestamp Data subfield in case of the Internet Timestamp option) of the IP-options field.

Typically, the Internet Timestamp option field (in case of Internet Protocol version 4; IPv4) is 'forty' bytes long, with the first octet reserved for 'option type', and the second octet and the third octet reserved for 'length' and 'pointer' respectively. The forth octate in case of the Internet Timestamp option is the combination of 'flag' and 'overflow' subfields, which in turn are followed by the 'Timestamp Data' space; with the 'Timestamp Data' space configured to store the IP addresses of each of the NAT devices (for instance, translators or gateways) that handled the IP datagram on its path from the source computing node 10 to the destination computing 14, in combination with the timestamps indicative of the respective time at which each of the NAT devices received the IP datagram.

As described above, the 'option-type', 'length', 'pointer', and the combination of 'flag' and 'overflow' occupy 'one' octet (byte) each, with the remaining 'thirty-six' bytes being rendered available for manipulation by the gateways situated along the network path between the source computing node 10 and the destination computing node 14. However, in this case, the 'source IP address' inserted by the computer processor occupies 'four' bytes, and the 'source port number' inserted by the computer processor occupies 'two bytes', thereby resulting in a total of 'ten' out of 'forty' bytes being occupied by the combination of 'option type', 'length', 'pointer', 'flag and overflow', 'source IP address' and 'source port number'. Accordingly, the Internet Timestamp option in this case is left with 'thirty' unused byte spaces which could potentially accommodate 'three' more IP addresses and timestamps in combination—each IP address and corresponding timestamp measuring 'four' bytes respectively.

In accordance with the present disclosure, the objective of step 204 is to manipulate the Internet Timestamp option—after storing the 'source port number' and 'source IP address' therein—in such a way that the 'thirty' vacant byte spaces are rendered unavailable for translator 12 and that the Internet Timestamp option field appears FULL (at least) to the translator 12. Accordingly, the computer processor programs the 'length' subfield to hold the value 'ten'; with the 'length' subfield denoting the total value of the Internet Timestamp option field, and the value 'ten' indicating the total number of bytes consumed by the combination of 'option-type' (one byte), 'length' (one byte), 'pointer'(one byte), 'flag and overflow' (one byte), 'source IP address' (four bytes) and 'source port number' (two bytes). Subsequently, the computer processor also programs the 'pointer' subfield by incrementing the value of the pointer from 'zero' to 'eleven' (conventionally, the value of pointer would have been incremented by 'eight' subsequent to the insertion of a four-byte NAT device IP address/translator IP address and a four byte timestamp, by the translator 12) thereby explicitly configuring the value of the 'pointer' to be greater than the value associated with the 'length' subfield of the Internet Timestamp option.

Conventionally, the translator 12, subsequent to receiving the IP datagram from the source computing node 10, checks inter-alia for the presence of the Internet Timestamp option field. If the Internet Timestamp option field is determined to be present, then the translator 12 inserts its own IP address, i.e. the NAT device IP address/translator IP address, and the timestamp into the 'Timestamp Data' space (subfield) of the Internet Timestamp option field and increments the 'pointer' by 'eight' such that the pointer points to the next byte sized memory location assigned to the Internet Timestamp option field for storing any subsequent IP address and timestamp combinations (which might belong to any other intermediary translators situated in between the source computing node 10 and the destination computing node 14). However, if the translator 12, subsequent to processing the 'length' and 'pointer' subfields of the Internet Timestamp option field determines that the value stored in the 'pointer' subfield is greater than the value stored in the 'length' subfield, i.e. the 'pointer' points beyond the last possible memory location available for storing the IP address and timestamp combination as a part of the Timestamp Data, then the translator 12 concludes that the Internet Timestamp option field (corresponding to the said IP datagram) is FULL and consequentially abstains from inserting its own IP address (NAT device IP address/translator IP address) and the timestamp into the Timestamp Data space, and instead forward transmits the IP datagram without inserting its IP address (NAT device IP address/translator IP address) and the timestamp into the Internet Timestamp option field and more specifically into the Timestamp Data subfield, thereby taking a significant deviation from its default behaviour, and consequentially providing for the 'source IP address' and 'source port number' to be retained in a non-manipulable manner within the Internet Timestamp option field of the IP datagram.

Referring again to step 204, since the computer processor installed within the source computing node 10 has specifically programmed the 'pointer' subfield to exceed the value stored in the 'length' subfield, the translator 12 on its part determines the Internet Timestamp option field of the IP datagram to be FULL, and accordingly abstains from inserting its own IP address (NAT device IP address/translator IP address) and the timestamp, into the route 'Timestamp Data' subfield, as well as from appending the (combination of) NAT device IP address and timestamp onto 'source IP address' and 'source port number' entries (constituting the mapping information useful in tracing the IP datagram back to the origin, i.e. source computing node 10, and profiling the IP datagram based on the origin thereof) stored within the Internet Timestamp option field.

As illustrated in step 206 of FIG. 2, by explicitly configuring, via the computer processor installed within the source computing node 10, the value of the 'pointer' subfield to be greater than the value associated with the 'length' subfield, in the case of both the IP Internet Timestamp option and IP Record Route option, the method envisaged by the present disclosure renders the IP Internet Timestamp option and IP Record Route option (which are collectively referred to as IP-options field) non-manipulable to the translator 12. And thereby, as described in step 208, the method envisaged by the present disclosure provides the destination computing node 14 with continued access to the source IP address and source port number corresponding to an incoming IP datagram, via the IP-options field.

In accordance with the present disclosure, the fact that the translator 12 abstains from inserting its IP address (NAT device IP address/translator IP address) and the timestamp into the corresponding Timestamp Data space, and consequentially from appending the NAT device IP address and timestamp onto the (previously) stored 'source IP address' and 'source port number' entries, after being tricked into concluding that the Internet Timestamp option field is FULL, marks a significant deviation from the default (conventional and well-known) behaviour associated with the translator 12. Such a deviation from the default behaviour paves the way of effective and efficient implementation of micro-segmentation policies which in turn involves inter-alia inspecting each of the IP datagrams received at respective end-points, profiling each IP datagram based on the 'source IP address' and 'source port number' associated therewith, and deducing appropriate PACKET DROP and PACKET ACCEPT decisions based on the origin endpoints of the IP datagrams.

Further, by preserving the 'source IP address' and 'source port number' for further processing at the destination computing node 14, the method envisaged by the present disclosure facilitates effective and efficient implementation of micro-segmentation policies at the destination computing node 14. As described above, subsequent to being tricked into concluding that the Internet Timestamp option field is FULL, the translator 12 is obligated to forward transmit the corresponding IP datagram without inserting its own IP address (NAT device IP address/translator IP address) and the corresponding timestamp into the Internet Timestamp option field, albeit replacing the 'source IP address' and 'source port number' stored respectively within the 'source IP address' field and the 'source port number' fields of the corresponding IP header, with a translated IP address and translated port number respectively. However, even though the translator 12 replaces the 'source IP address' and 'source port number' stored within the 'source IP address' and 'source port number' fields of the IP header, a replica of the 'source IP address' and 'source port number' (constituting the constituting the mapping information useful in tracing the IP datagram back to the origin, i.e. source computing node 10) is stored in a non-manipulable manner in the Internet Timestamp option field (and more specifically within the Timestamp Data subfield) of the IP header. Accordingly, when the translator 12 forward transmits the IP datagram to the destination computing node 14, the policy controller installed within the destination computing node 14 processes the IP datagram and retrieves from the Internet Timestamp option field the 'source IP address' and the 'source port number' which are in turn used for the implementation of micro-segmentation policies which as described earlier necessitate the availability of mapping information (i.e. the source IP address and source port number) which is used to trace the IP datagram back to the origin endpoint and also to deduce appropriate PACKET DROP and PACKET ACCEPT decisions based on pre-defined micro-segmentation policies specifying the actions/decisions to be implemented in respect of IP datagrams determined to be emanating from the said origin endpoint.

In accordance with an exemplary embodiment of the present disclosure, a magic number is selectively embedded onto the Record Route option field or the Internet Timestamp option field to indicate that the mapping information (i.e. the 'source IP address' and the 'source port number) stored therein is indeed different than the information that would have been conventionally stored in the Record Route option field and the Internet Timestamp option field. Typically, the magic number constitutes a pre-agreed integer expressed with 'four' bytes.

Typically, the source computer node 10 arrives at an agreement with the destination computing node in terms of the integer value to be associated with the magic number such that the presence of the magic number in the IP datagram transmitted from the source computer node 10 signals the presence of mapping information within either the Record Route option of the corresponding IP header or the Internet Timestamp option of the corresponding IP header. The magic number preferably precedes the combination of the 'source IP address' and 'source port number' incorporated within the Record Route option field or the Internet Timestamp option field. In this case, the magic number is utilized to indicate to the policy controller installed on the destination computing node 14, the presence of the 'source IP address' and 'source port number' within either the Record Route option field or the Internet Timestamp option field of the IP datagram, instead of the conventional NAT device IP address/translator IP address in case of the Record Route option field and the combination of the NAT device IP address/translator IP address and the timestamp in case of the Internet Timestamp option field.

As discussed above, the mapping information stored within either the Record Route option field or the Internet Timestamp option field always begins with the magic number thereby making it possible for the policy controller to identify the presence of the mapping information within the Record Route option field and the Internet Timestamp option field.

In accordance with the exemplary embodiment of the present disclosure, in case of the presence of magic number within the Record Route option field, an additional 'four' bytes are occupied (within the Record Route option field) by the magic number. As described earlier, the Record Route option field (in case of Internet Protocol version 4; IPv4) is 'forty' bytes long. The first 'three' bytes are reserved for 'option type', 'length' and 'pointer' respectively. The magic number typically occupies 'four' bytes and the combination of the 'source IP address' and 'source port number' occupies the next 'six' bytes. In total, the combination of 'option type', 'length', 'pointer', 'magic number', 'source IP address', and 'source port number' occupy a total of 'thirteen' bytes out of the available 'forty' bytes, thereby leaving out, within the Record Route option field, a total of 'twenty-seven' bytes capable for storing a maximum of 'six' IP addresses measuring 'four' bytes each. Subsequently, the 'length' subfield of the Record Route option is programmed (by the computer processor) to store the value 'thirteen' (the value 'thirteen indicating the length of the Record Route option field). Further, given the need to theoretically mask the twenty-seven vacant bytes in order to project the Record Route option as FULL, the computer processor programs the 'pointer' field by incrementing the value of the pointer to 'fourteen'; one count more than the value stored in the 'length' subfield, thereby causing the value of the 'pointer' subfield to exceed the value of the 'length' subfield, which in turn is the condition to be satisfied for projecting the Record Route option as being FULL.

In accordance with the exemplary embodiment of the present disclosure, in case of the presence of magic number within the Internet Timestamp option field, an additional 'four' bytes are occupied by the magic number, as was the case with the Record Route option. As described earlier, the Internet Timestamp option field (in case of Internet Protocol version 4; IPv4) is 'forty' bytes long. The first 'four' bytes are reserved for 'option type', 'length' 'pointer', 'flag and overflow' subfields respectively. The magic number typically occupies 'four' bytes and the combination of the 'source IP address' and 'source port number' occupies the next 'six' bytes. In total, the combination of 'option type', 'length', 'pointer', 'flag and overflow', 'magic number', 'source IP address', and 'source port number' occupy a total of 'fourteen' bytes out of the available 'forty' bytes, thereby leaving out, within the Internet Timestamp option field, a total of 'twenty-six' bytes capable for storing a maximum of 'three' combinations of IP addresses and timestamps respectively; the IP addresses and the timestamps measuring 'four' bytes each respectively. Subsequently, the 'length' subfield of the Internet Timestamp option is programmed (by the computer processor) to store the value 'fourteen' (the value 'fourteen' indicating the length of the Internet Timestamp option field). Further, given the need to theoretically mask the twenty-six vacant bytes in order to project the Internet Timestamp option as FULL, the computer processor programs the 'pointer' field by incrementing the value of the pointer to 'fifteen'; one count more than the value stored in the 'length' subfield, thereby causing the value of the 'pointer' subfield to exceed the value of the 'length' subfield, which in turn is the condition to be satisfied for projecting the Record Route option as being FULL.

Figure 3:
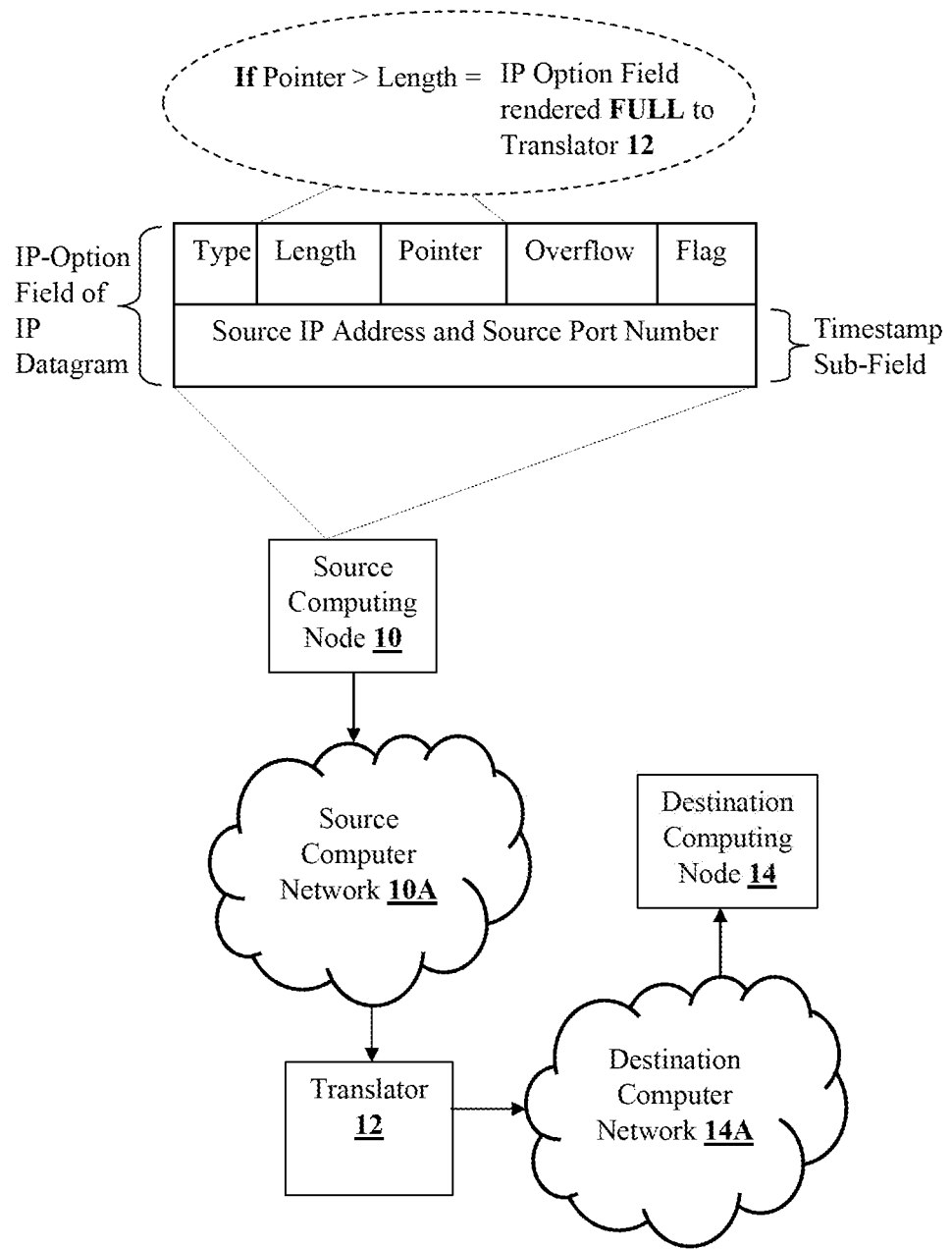
FIG. 3A is a block diagram illustrating transmission of the IP datagram from the source computing node to the destination computing node, with the source IP address and source port number stored within the IP Internet Timestamp field of the IP datagram.
FIG. 3B is a block diagram illustrating transmission of the IP datagram from the source computing node to the destination computing node, with the source IP address and source port number stored in the IP Record Route field of the IP datagram.
Figure 3A:
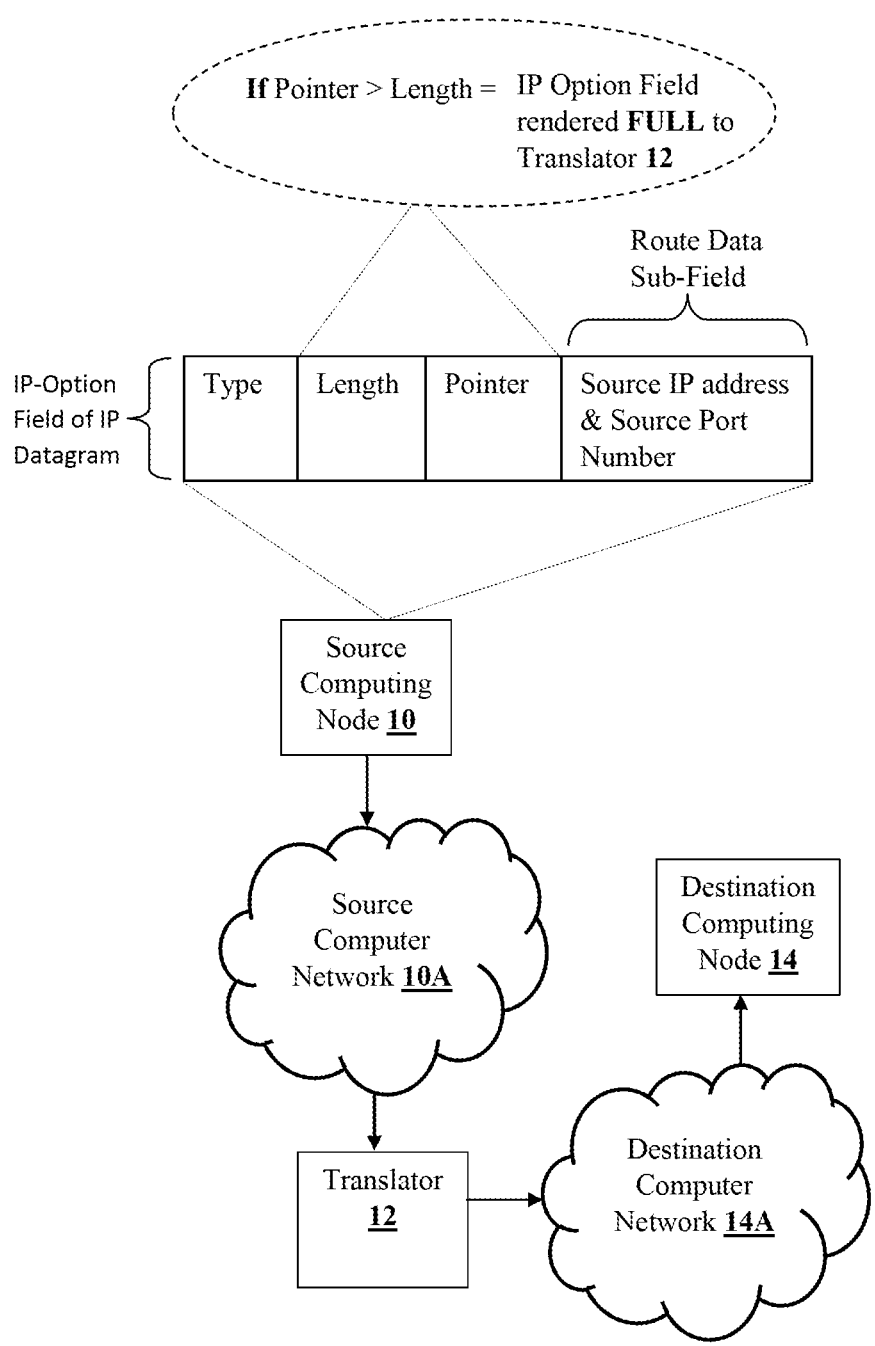

In accordance with the present disclosure, FIG. 3 illustrates the source computing node 10 as storing the source IP address and source port number of the IP datagram in an IP Internet Timestamp option field of the IP datagram, and configuring the 'pointer' subfield of the Internet Timestamp option field to be greater than the 'length' subfield (of the Internet Timestamp option field), such that the translator 12 considers the Internet Timestamp option (of the IP datagram) as FULL, and consequentially abstains from inserting its own IP address (NAT device IP address/translator IP Address) and timestamp into the Internet Timestamp option and instead forward transmits the IP datagram, to the destination computing node 14, without inserting the timestamp and the translator IP address into the Internet Timestamp option (of the IP datagram). Likewise, FIG. 3A illustrates the source computing node 10 as storing the source IP address and source port number of the IP datagram in an IP Record Route option field of the IP datagram, instead of the IP Internet Timestamp option. In such a case, the source computing node 10 configures the 'pointer' subfield of the Record Route option field to be greater than the 'length' subfield (of the Record Route option field), such that the translator 12 considers the Record Route option (of the IP datagram) as FULL, and consequentially abstains from inserting its own IP address (NAT device IP address/translator IP Address) and timestamp into the Record Route option and instead forward transmits the IP datagram, to the destination computing node 14, without inserting the timestamp and the translator IP address into the Record Route option (of the IP datagram).

Technical Advantages

The technical advantages of the present disclosure include the realization of a computer implemented system and method that enabled simultaneous implementation of microsegmentation and the traditional network gateways in a computer network, by providing for the source IP address and source port number—the pair constituting one of the basic building blocks necessary for implementing effective software-based micro segmentation—corresponding to an IP datagram transmitted across the computer network via one or more network gateways, to be preserved for access by a micro-segmentation controller. Further, the present disclosure also envisages simultaneous implementation of micro-segmentation and network gateways without compromising on neither the security of the computer network nor the operational efficiency of the computer network. Further, the system and method envisaged by the present disclosure constitute an in-band mechanism for transmitting source IP address and source port number corresponding to an IP datagram, which in turn is an effective alternative to the traditional out-of-band transmission mechanism. Further, the in-band transmission mechanism envisaged by the present disclosure is not plagued by latency related drawbacks and higher packet drop rates as was the case with conventional out-of-band transmission mechanisms. Further, the present disclosure envisages using standardized IP-options fields to store the information (including the source IP address and the source port number) pertaining to an IP datagram, thereby ensuring that the IP datagram retains the information pertinent to the source IP address and the source port number, despite the IP datagram having been transmitted through one or more IP gateways. Further, the present disclosure envisages a methodology to anticipate the default behaviour of a gateway to replace the source IP address and source port number assigned to the IP datagram with a translated IP address and translated port number, and to retain the information corresponding to the source IP address and source port, in the (corresponding) IP datagram, despite the IP datagram having been processed by at least one gateway. By anticipating the default behaviour of the gateways in terms of replacing the source IP address and source port number with the translated IP address and translated port number, the present disclosure not only provides a solution for retaining the source IP address and source port number in a non-manipulable manner within the IP datagram but also provides an efficient basis for implementing microsegmentation which in turn uses the information identifying the source IP address and source port number of an IP datagram, as a basic building block for implementing fine-grained security policies across a computer network, which would either cause the incoming IP datagram to be processed or dropped or forwarded to an alternative destination.

What is claimed is:

1. A computer implemented method for inserting mapping information corresponding to an Internet Protocol (IP) datagram, in an IP-options field of said IP datagram prior to routing said IP datagram from a source computing node to a destination computing node, said method comprising the following computer-implemented steps:

creating, by the source computing node, an IP datagram to he routed to the destination computing node via one or more Network Address Translation (NAT) devices;

processing, by the source computing node, at least an IP-options field of said IP datagram, and inserting a source IP address and a source port number indicative of said source computing node, into said IP-options field, in addition to inserting the source IP address and the source port number into predetermined fields of a corresponding IP datagram header; and configuring, by the source computing node, said IP-options field such that the one or more NAT devices do not manipulate the IP-options field by adding corresponding NAT devices' IP address thereto and further by replacing said source IP address and source port number stored within said IP-options field with said NAT devices' IP address during routing of said IP datagram from the source computing node to the destination computing node, thereby ensuring that the IP-options field of said IP datagram incorporates only the source IP address and the source port number in a non-manipulable manner despite said IP datagram being routed via the one or more NAT devices; and providing the destination computing node with continued access to source IP address and source port number through the IP-options field, despite the source IP address and source port number stored in said predetermined fields of said IP datagram header being replaced by a translated IP address and a translated port number respectively at the one or more NAT devices during routing of said IP datagram, and further enabling the destination computing node to ascertain an origin of said IP datagram based on the source IP address and source port number stored within the IP-options field of said IP datagram.

2. The method as claimed in claim 1, wherein the step of configuring the IP-options field such that the one or more NAT devices do not manipulate the IP-options field, further includes the step of configuring a pointer subfield and a length subfield of the IP-options field such that value of the pointer subfield always exceeds a value of the length subfield, thereby indicating that the IP-options field is FULL, and thereby triggering the one or more NAT devices to forward transmit the IP datagram without adding corresponding NAT devices' IP address to the IP-options field, and thereby retaining said source IP address and source port number in said non-manipulable manner within said IP-options field.

3. The method as claimed in claim 1, wherein the step of inserting the source IP address and the source port number into an IP-options field of the IP datagram, further includes the step of inserting the source IP address and the source port number into an Internet Timestamp option field of the IP datagram.

4. The method as claimed in claim 1, wherein the step of inserting the source IP address and the source port number, into an IP-options field of the IP datagram, further includes the step of inserting the source IP address and the source port number into a Record Route option field of the IP datagram.

5. A non-statutory computer readable medium having computer readable instructions stored thereupon, the computer readable instructions when executed by a computer processor embodied within a source computing node, cause the computer processor to:

create an Internet Protocol (IP) datagram to be routed from the source computing node to a destination computing node via one or more Network Address Translation (NAT) devices;

process said IP datagram, and identify a source IP address and a source port number corresponding to the source computing node, to be inserted into predetermined fields of the IP datagram;

insert the source IP address and the source port number into an IP-options field of the IP datagram, in addition to inserting said source IP address and source port number into said predetermined fields of an IP datagram header;

configure the IP-options field such that the one or more NAT devices do not manipulate the IP-options field by adding corresponding NAT devices' IP address thereto and further by replacing said source IP address and source port number with said NAT devices' IP address during routing of the IP datagram from the source computing node to the destination computing node, thereby ensuring that the IP-options field of the IP datagram incorporates only the source IP address and the source port number in a non-manipulable manner, despite said IP datagram being routed via the one or more NAT devices;

provide the destination computing node with continued access to source IP address and source port number via the IP-options field, despite the source IP address and source port number stored in said predetermined fields of said IP datagram header being replaced by a translated IP address and a translated port number respectively, at the one or more NAT devices during routing of said IP datagram, and further enable the destination computing node to ascertain an origin of said IP datagram based on the source IP address and source port number stored within the IP-options field of said IP datagram.

6. The computer readable instructions as claimed in claim 5, when executed by the processor, further trigger the processor to configure a pointer subfield and a length subfield of the IP-options field such that value of the pointer subfield always exceeds a value of the length subfield, thereby indicating that the IP-options field is FULL, and triggering the one or more NAT devices to forward transmit the IP datagram without adding corresponding NAT'ed IP address and NAT'ed port number to the IP-options field, thereby retaining said source IP address and source port number in a non-manipulable manner within said IP-options field.

7. The computer readable instructions as claimed in claim 5, when executed by the processor, further cause the processor to insert the source IP address and the source port number into an Internet Timestamp option field of the IP datagram.

8. The computer readable instructions as claimed in claim 5, when executed by the processor, further cause the processor to insert the source IP address and the source port number into a Record Route option field of the IP datagram.

9. A computer implemented system for inserting mapping information corresponding to an Internet Protocol (IP) datagram, in an IP-options field of said IP datagram prior to routing said IP datagram, said system comprising:
    a source computing node communicably coupled to a destination computing node via one or more Network Address Translation (NAT) devices, said source computing node configured to:
        create an IP datagram to be routed from the source computing node to a destination computing node via one or more NAT devices;
    process said IP datagram, and identify a source IP address and a source port number corresponding to the source computing node, to be inserted into predetermined fields of the IP datagram;
    insert the source IP address and the source port number into an IP-options field of the IP datagram, in addition to inserting said source IP address and source port number into said predetermined fields of an IP datagram header;
    configure the IP-options field such that the one or more NAT devices do not manipulate the IP-options field by adding corresponding NAT devices' IP address thereto and further by replacing said source IP address and source port number stored within said IP-options field with said NAT devices' IP address during routing of the IP datagram from the source computing node to the destination computing node, thereby ensuring that the IP-options field of the IP datagram incorporates only the source IP address and the source port number in a non-manipulable manner, despite said IP datagram being routed through the one or more NAT devices;
    provide the destination computing node with continued access to source IP address and source port number via the IP-options field, despite the source IP address and source port number stored in said predetermined fields of said IP datagram header being replaced by a translated IP address and a translated port number respectively, at the one or more NAT devices during routing of said IP datagram, thereby enabling the destination computing node to ascertain an origin of said IP datagram based on the source IP address and source port number stored within the IP-options field of said IP datagram.

10. The system as claimed in claim 9, wherein the source computing node configures a pointer subfield and a length subfield of the IP-options field such that value of the pointer subfield always exceeds a value of the length subfield, thereby indicating that the IP-options field is FULL, and triggering the one or more NAT devices to forward transmit the IP datagram without adding the corresponding NAT devices' IP address to the IP-options field, thereby retaining said source IP address and source port number in said non-manipulable manner within said IP-options field.

11. The system as claimed in claim 9, wherein the source computing node is further configured to insert the source IP address and the source port number into an Internet Timestamp option field of said IP datagram.

12. The method as claimed in claim 9, wherein the source computing node is further configured to insert the source IP address and the source port number into a Record Route option field of said IP datagram.

* * * * *